United States Patent [19]

McDougall et al.

[11] Patent Number: 5,031,700
[45] Date of Patent: Jul. 16, 1991

[54] METHOD OF IMPROVING FORMATION PERMEABILITY USING CHLORINE DIOXIDE

[75] Inventors: Lee A. McDougall; Dennis A. Williams, both of Houston, Tex.

[73] Assignee: Exxon Chemical Patents Inc., Linden, N.J.

[21] Appl. No.: 538,572

[22] Filed: Jun. 15, 1990

[51] Int. Cl.$^5$ ............................................. E21B 43/27
[52] U.S. Cl. .................... 166/307; 166/305.1; 166/312; 252/8.553
[58] Field of Search ............... 166/271, 305.1, 307, 166/312; 252/8.552, 8.553

[56] References Cited

U.S. PATENT DOCUMENTS

| | | | |
|---|---|---|---|
| 2,356,205 | 8/1944 | Blair, Jr. et al. | 166/305.1 U X |
| 3,122,503 | 2/1964 | Katzer | 166/312 X |
| 3,254,718 | 6/1966 | Dunlap | 166/307 |
| 3,556,221 | 1/1971 | Haws et al. | 166/305.1 |
| 3,651,868 | 3/1972 | Caudle et al. | 166/312 X |
| 4,464,268 | 8/1984 | Schievelbein | 166/312 X |
| 4,823,826 | 4/1989 | Sacco | 166/310 X |
| 4,846,981 | 7/1989 | Brost | 166/305.1 X |
| 4,871,022 | 10/1989 | McGlathery | 166/305.1 X |
| 4,886,609 | 12/1989 | Walton | 252/8.552 |
| 4,892,148 | 1/1990 | Mason | 166/305.1 |

Primary Examiner—George A. Suchfield
Attorney, Agent, or Firm—R. L. Graham

[57] ABSTRACT

Permeability of a subterranean formation is increased by injecting into the formation sufficient amount of chlorine dioxide solution to react with formation clays and silicates. The pH of the $ClO_2$ solution is controlled between 0.01 and 3.2 using preferably a mineral acid and liquid $CO_2$ blended with the aqueous $ClO_2$ solution.

10 Claims, 2 Drawing Sheets

METHOD OF IMPROVING FORMATION PERMEABILITY USING CHLORINE DIOXIDE

FIELD OF THE INVENTION

The present invention relates to the stimulation of production of subterranean hydrocarbon bearing formations or stimulation of fluid injection into subterranean formations using chlorine dioxide. In one aspect, it relates to the injection of aqueous chlorine dioxide into a sandstone formation at matrix rates to improve the permeability of the formation. In another aspect, the present invention relates to the use of $CO_2$ as pH control for chlorine dioxide well treatments.

BACKGROUND OF THE INVENTION

During recent years chlorine dioxide has been proposed for use as an oxidant in a variety of well treating operations. These treatments, however, have generally involved the removal of formation damage caused by polymer deposits. For example, U.S. Pat. No. 4,871,022 discloses the use of chlorine dioxide to degrade polymer deposits encountered in secondary and tertiary recovery operations. U.S. Pat. No. 4,846,981 discloses a similar use of chlorine dioxide in well acidizing operations. Canadian Patent No. 1,207,269 discloses the use of chlorine dioxide in the separation of oil and water in oil producing operations. Chlorine dioxide has also been used as a scavenger for hydrogen sulfide as described in U.K. Patent Application No. 2170220A.

Other oxidants used in well treating processes include sodium hypochlorite, (U.S. Pat. Nos. 3,486,636; 3,29,669; 3,556,221), hydrogen peroxide, (U.S. Pat. No. 4,464,268).

As described in detail below, the use of chlorine dioxide in accordance with the present invention results in formation stimulation by reacting with clays, silicaeous materials, sand, drilling mud, or cement filtrate. The treatment has the same objective as treatments using mud acid (mixture of HF and HCl), but accomplishes the improvement by entirely different chemistry. The chlorine dioxide treatment according to the present invention, moreover, offers several advantages over mud acid treatments: (a) it is much less expensive, (b) it avoids the hazards and toxicity of HF, and (c) it avoids the deposits such as sodium or potassium fluorosilicates and $CaF_2$.

SUMMARY OF THE INVENTION

It has surprisingly been discovered that chlorine dioxide can be used to stimulate the production of oil and gas wells or injection wells. Chlorine dioxide used in accordance with the present invention improves permeability of a producing sandstone formation by reacting with and dissolving clay, siliceous material, drilling mud, and cement filtrate. This is in contrast to prior art uses of chlorine dioxide which merely restored permeability by removing organic, polymer, biological and iron sulfide damage. The process of the present invention which achieves improved permeabilities comprising the steps of (a) injecting at matrix rates into a subterranean sandstone formation an aqueous solution of chlorine dioxide having a pH between 0.01 and 3.5; (b) permitting the chlorine dioxide to react with clays and silicates in the formation to improve the permeability thereof; and (c) removing fluids and reaction products from the near wellbore region.

In a preferred embodiment, the aqueous chlorine dioxide will include an effective amount of a micellar solvent to enhance water wetting of the formation sands.

Although the pH control of the aqueous solution may be achieved by the use of any acid such as HCl, HF, acetic, formic, sulfamic, citric, and mixtures thereof, it is preferred to employ liquid $CO_2$ in the aqueous solution. $CO_2$ forms carbonic acid and provides a buffered acid solution at the desired pH. $CO_2$ or mixtures of $CO_2$ and a mineral acid (e.g. HCl) may be used.

The $CO_2$ content of the aqueous chlorine dioxide may range from 1.0 to 85.0 volume percent. The preferred range is 5 to 50 vol %, and most preferred 10–30 vol %.

DESCRIPTION OF THE PREFERRED EMBODIMENTS

Figure 1:
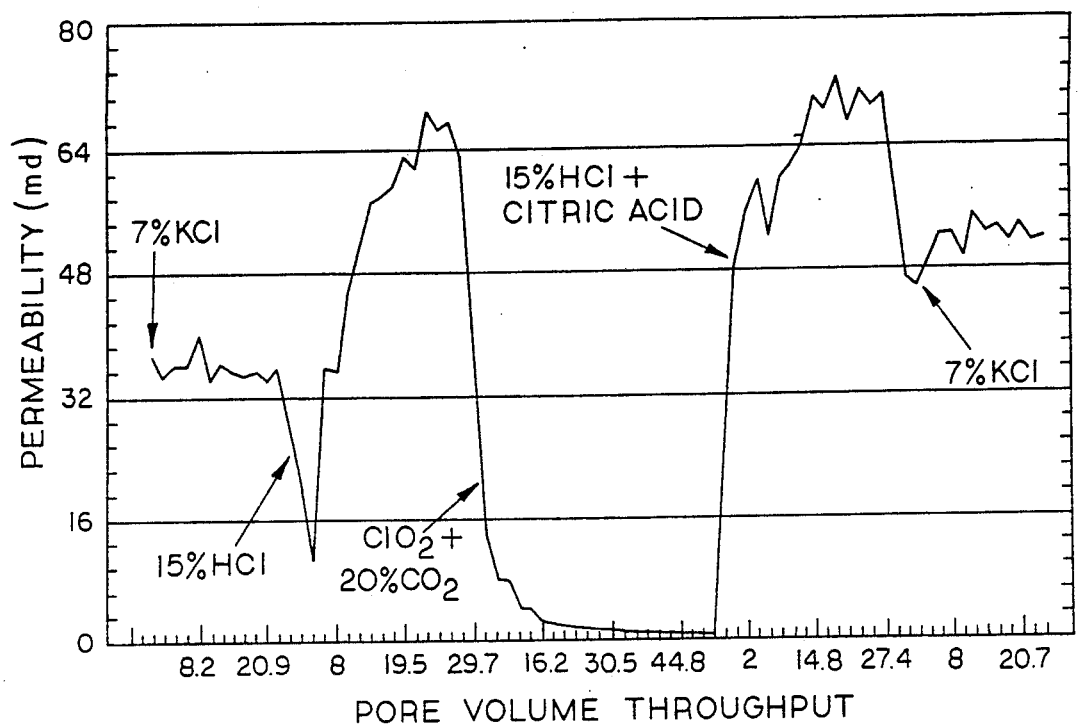
FIG. 1 is a plot showing the effects of chlorine dioxide treatment on formation permeability (solution pH of 3.2 with 20% $CO_2$).

As mentioned previously, an important objective of the present invention is to improve the permeability of a subterranean hydrocarbon bearing sandstone formation by the use of chlorine dioxide. Most sandstone formations contain clays which can substantially restrict the flow of fluids and thereby result in low permeability.

Since well productivity is a function of permeability, stimulation techniques are designed to increase formation permeability. One such technique includes matrix acidizing which employs mud acid (i.e. a mixture of HF and HCl). In this process, HF reacts with clay and silicates to increase the formation permeability greater than its native permeability. Stimulation ratio is measured by the ratio of permeability after treatment to native permeability. In matrix sandstone acidizing stimulation ratios in the order of 1.5 to 2.0 may be achieved. It should be observed that matrix acidizing is quite different from fracturing treatments. In the former technique, the well treating fluid is injected at rates and pressure which are below that required to fracture the formation. Fracturing does not increase the native permeability of the formation, but instead creates a vertical crack or fracture which alters the flow geometry of the formation.

The process according to the present invention is a stimulation technique capable of achieving stimulation ratios comparable to mud acid treatments.

The matrix sandstone treatment according to the present invention employs an aqueous solution of chlorine dioxide having a low pH. The principal process variables include the concentration of chlorine dioxide, pH control, and volume of treating solution.

The concentration of the chlorine dioxide in the solution will depend upon several factors, including the amount of clay present, temperature, type of cementaceous material, and volume of fluid to be pumped. Normally, however, the concentration of the chlorine dioxide in the aqueous medium will be between 50 and 4,200 ppm, preferably between 100 to 3,500 ppm, and most preferably between 1,000 and 3,000 ppm.

The pH control is preferably achieved by the addition of liquid $CO_2$ or a mixture of $CO_2$ and a mineral acid to the aqueous treatment fluid, although gaseous $CO_2$ may be employed as well. The treating solution should contain sufficient acid to maintain a pH of between 0.01 and 3.2, preferably between 0.01 and 2.0, and most preferably between 0.1 and 2.0. It is also preferred to use from 1 vol % to 85 vol %, preferably 5 vol % to 50 vol %, and most preferably 10 to 30 vol %, of the liquid $CO_2$ in the treating solution. The acid, liquid $CO_2$, and $ClO_2$ may be added to the treating water in any order. The preferred order, however, is $ClO_2$, acid, and liquid $CO_2$. The liquid $CO_2$ is added under pressure, usually greater than 300 psig, to maintain it in the liquid form.

A benefit of using liquid $CO_2$ instead of a mineral acid such as HCl is that such a solution is less hazardous both before and after it is injected into the well. It is less corrosive to metal goods and less toxic to humans. The spent solution would be no more harmful than carbonated water.

Also, since the pH is greater than 2.0 when using $CO_2$ as the sole pH control agent, it is not a "characteristic" hazardous waste as defined in 40 CFR Ch. 1 (07-01-86 Edition) Subpart C - Characteristics of Hazardous Waste. If HCl is pumped into sandstone of low carbonate rock content, the return fluid pH would most likely be less than 2.0, therefore an EPA hazardous waste.

The chlorine dioxide may be used as a aqueous solution generated at the site of use. As is known, chlorine dioxide is an unstable highly reactive gas which is soluble in water. Because of its instability, it is common for chlorine dioxide to be generated at the point of use and used immediately. Several methods of onsite preparation of chlorine dioxide is described, as for example, in U.S. Pat. Nos. 4,077,879, 4,247,531, and 4,590,057, all of which are incorporated herein by reference.

Alternatively, the chlorine dioxide may be added in the form of stabilized chlorine dioxide solution. Stabilized chlorine dioxide is a compound which dissociates and tends to maintain the available chlorine dioxide in the aqueous solution at a fixed level. DIKLOR L marketed by Exxon Chemical Company is a stabilized chlorine dioxide.

The volume of the aqueous acid solution of $ClO_2$ may vary within a realtively broad range (depending in part to economics) but treatments of 50 to 200 gallons/ft of formation height will be satisfactory to achieve the desired degree of stimulation. This will provide radial formation invasion of from 1 to 10 feet, depending on formation porosity and permeability.

Other additives such as KCl, surfactants, and corrosion inhibitors, chelating agents may also be incorporated in the treatment.

It is particularly preferred to employ a micellar solvent to water wet the formation sand and clays to enhance oil removal therefrom. These micellar solvents contain high molecular weight, acid insoluble polar organic components which have the ability to strip away physical barriers and allow the $ClO_2$ to react with formation materials. The preferred micellar solvent is a blend of ethoxylated alcohols, immiscible $C_4$-$C_{10}$ alcohols, and a surfactant capable of dispersing the immiscible alcohols as a micelle in water or acid.

Operation

Prior to commencing pumping operations, aqueous chlorine dioxide is generated at the well site. DIKLOR S generated by a system provided by Exxon Chemical Company is one source of chlorine dioxide. This system generates aqueous chlorine dioxide at concentration levels of 50 to about 4,200 ppm.

For many treatments, 3,000 to 20,000 gallons of the dilute (50 to 4,200 ppm) chlorine dioxide will be prepared in a rig tank using available municipal water or fresh water. Preferably, generated chlorine dioxide is used (e.g. DIKLOR S). In this system, the aqueous chlorine dioxide is generated and blended with other treating materials and pumped down the well.

In a preferred embodiment of the invention, the $ClO_2$ treatment will be carried out in the normal manner which may involve the following injection sequence (all at matrix rates):

(a) A preflush aqueous solution of KCl (1–10 wt %) is pumped through the flow line, down the well tubing and into the formation to displace formation fluids away from the wellbore.

(b) A flush of hydrochloric acid stage is then injected into the formation to dissolve acid soluble materials. A sequestering and/or chelating agent may be included in the acid.

(c) A low pH (3.2 or less) solution of $ClO_2$ is then injected into the formation. A solution of $ClO_2$ is mixed and pumped at a rate and pressure to achieve matrix injection. During the pumping operations, $CO_2$ (if used) is blended with the $ClO_2$ solution at a pressure sufficient to maintain the $CO_2$ in the liquid phase. The liquid $CO_2$ may be blended into the flow line between the $ClO_2$ solution pumps and the wellhead. KCl may also be used in the $ClO_2$ solution.

(d) A post flush of an acid solution containing a sequestering agent or chelating agent, (e.g. citric acid or ethylenediamine tetraacetic acid, etc.), is then injected into the formation to solubilize the aluminum and silicon compounds released by the action of $ClO_2$ and remove these reaction products away from the near wellbore region. It should be noted that an acid such as HCl is preferably used in the $ClO_2$ solution (Step C) so that these reaction products are solubilized as they are formed.

(e) Finally, an overflush of brine (e.g. KCl solution) is injected into the formation to displace the $ClO_2$, acid solution and reaction products into the formation.

The volumetric ratios of the above stages may be as follows (a) 0.10–0.25
(b) 0.25 to 0.50
(c) 1.0
(d) 0.25 to 0.5
(e) variable depending on volume of tubular goods for a particular well.

Following the pumping operations, the well is shut in for about 2–24 hours depending on bottom hole temperature, and then returned to producing or injection operations.

The following examples exemplify the injection sequence and the stimulation improvement resulting from the present invention.

EXPERIMENTS

Flow tests through cores were carried out to evaluate the effects of $ClO_2$ on sandstone core permeability.

Core preparation: Core plugs were cut from stock Berea core. The core plugs were one inch in diameter and between two and three inches in length. The ends of each core were trimmed and faced until the ends were parallel.

Materials: $ClO_2$ (DIKLOR® S manufactured by Exxon Chemical Co.)

Micellar solvent: TS 8773 manufactured by Exxon Chemical Co.

Initial Permeability Determination

The core was mounted in a Hassler Sleeve and heated to 225° F. An initial 7% KCl permeability was established.

Fluid Treatment

After the initial permeability to 7% KCl was established, acid (HCl) flush was flowed through the core. The micellar solvent, if used, was included in the flush fluid.

DIKLOR S was then pumped and samples taken of the effluent at approximately 60 ml increments. These samples were tested quantitatively for iron (total, $Fe^{+2}$, and $Fe^{+3}$), chlorine dioxide ($ClO_2$), chlorite ($ClO_2^{-1}$), sulfite ($SO_3$), sulfate ($SO_4^{-2}$), silica ($SiO_2$), and aluminum ($Al^{+3}$).

The core was then subjected to a cleanup stage using 15% HCl + 25 lb/1000 gal citric acid (a chelating agent).

The injection sequence was the same as described above in Operations (all wt % except as otherwise noted).

| Test | Injection Sequences | | | | |
|---|---|---|---|---|---|
| | (a) | (b) | (c) | (d) | (e) |
| A | 7% KCl | 15% HCl plus 5 vol % solvent | 2386 ppm $ClO_2$ 20 vol % $CO_2$ (pH 3.2) | 15% HCl 0.28% citric acid | 7% KCl |
| B | 7% KCl | 7% KCl 20 vol % $CO_2$ | about 2,000 ppm $ClO_2$ 7% KCl 20 vol % $CO_2$ (pH 3.2) | 15% HCl 0.28% citric acid | 7% KCl |
| C | 7% KCl | 15% HCl plus 5 vol % solvent | about 1,500 ppm $ClO_2$ 15% HCl 20% vol % $CO_2$ (pH 0.5) | 15% HCl 0.28% citric acid | 7% KCl |

In Test C, the treating solution (c) was made up of equal volume proportions of 3,000 ppm $ClO_2$ aqueous solution and 15% HCl aqueous solution.

FIG. 1 illustrates the injection profile of Test A. The initial permeability was about 35 millidarcies (mD); following treatment with $ClO_2$ and $CO_2$, the permeability increased to about 52 mD, an increase of 149% over the native undamaged formation.

Figure 2:
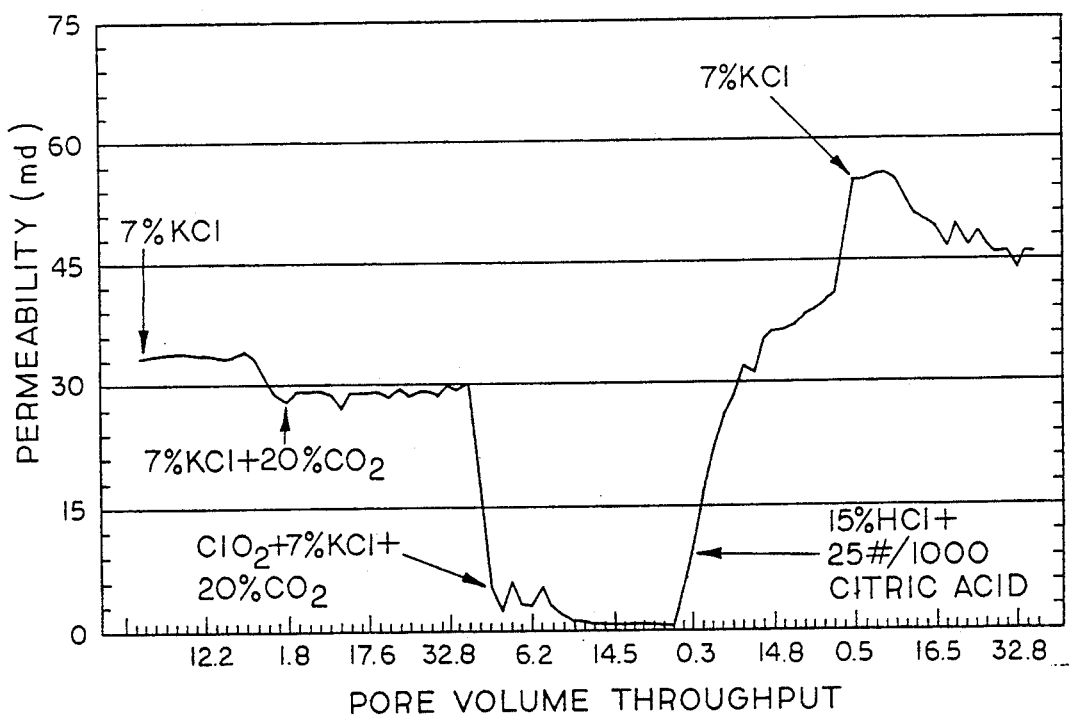
FIG. 2 is a plot showing the effects of chlorine dioxide treatment on formation permeability (solution pH of 3.2 with 20% $CO_2$).

FIG. 2 illustrates the flow profile for Test B. Here again the low pH solution provided by the $CO_2$ increased the undamaged formation permeability from 33 mD to 46 mD. The final permeability was 144% of the initial permeability which is similar to Test A. Also, the only source of acid was carbonic acid since no HCl is used until after stage c ($ClO_2/CO_2$). There was no acid/$ClO_2/CO_2$ mixing in the core. Therefore, control of the pH by $CO_2$ above ($CO_2$ buffers the pH at 3.2) is sufficient to attain high stimulation ratios.

Figure 3:
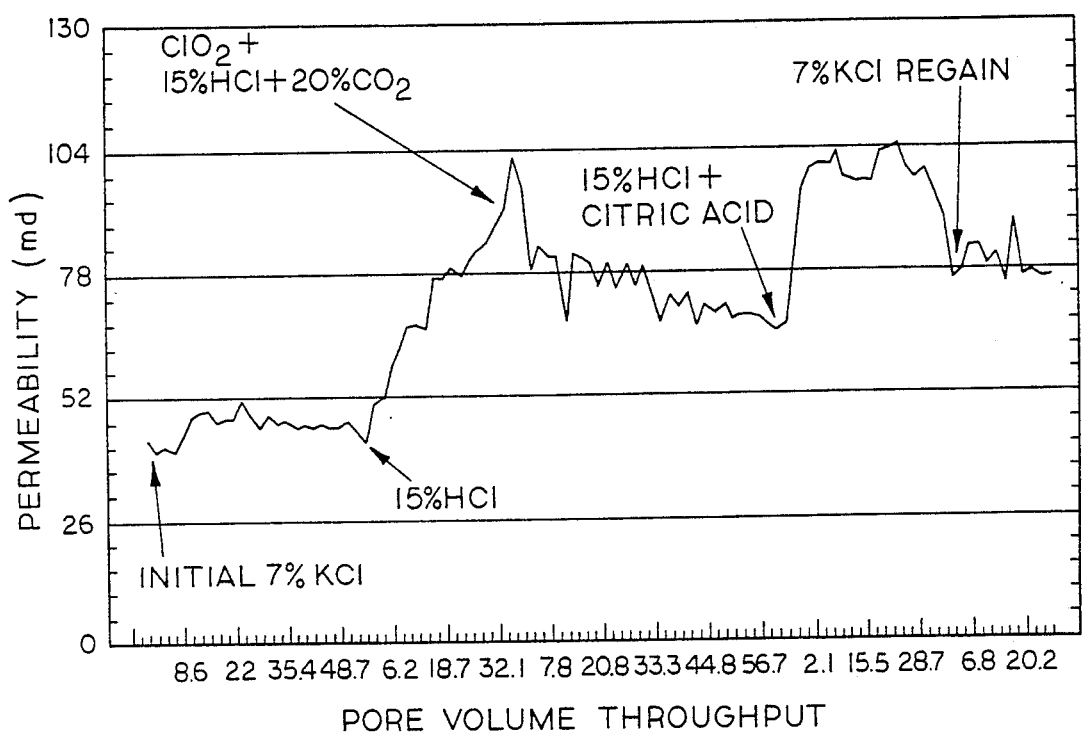
FIG. 3 is a plot showing effects of chlorine dioxide treatment on formation permeability (solution pH of about 0.2 with HCl and $CO_2$).

In Test C (FIG. 3), the $ClO_2$ solution contained 15% HCl and 20% $CO_2$ to provide a solution pH of about 0.2. This treatment resulted as a final permeability of 167% of initial permeability, which again is similar to results in Tests A and B. The preferred treatment according to the present invention involves the use of both $ClO_2$ and an acid for pH control of the $ClO_2$ solution, as exemplified by Test C. A comparison of FIG. 3 with FIGS. 1 and 2 reveals that the presence of the HCl with the $ClO_2$ removes the $ClO_2$ reaction products as they are formed.

Quantitative analysis of the core effluent obtained for the above tests surprisingly revealed the presence of substantial quantities of aluminum and silicate. These are believed to be the reaction products of chlorine dioxide and clays and other silicate present in the sandstone cores.

From the above tests, it can be seen that the $ClO_2$ treatment according to the present invention on undamaged cores is truly a stimulation process producing stimulation ratios in the order of 1.4 to 1.7. This is in sharp contrast to prior art techniques involving $ClO_2$ which merely restored permeability.

Although the preferred embodiment of the present invention has been described with emphasis on the treatment of polymer-free formations, it is to be noted that the embodiment of the invention involving the use of $CO_2$ contemplate the use in conjunction with any chlorine dioxide well treatment.

What is claimed is:

1. A method of treating a sandstone formation containing clays or silicates, which comprises:
    (a) injecting a treating liquid into the formation comprising an aqueous solution of:
        (i) from 50 to 4,200 ppm chlorine dioxide and
        (ii) from 1 to 85 volume percent of carbon dioxide;
    (b) permitting the chlorine dioxide to react with material in the formation; and
    (c) thereafter injecting into the formation an acid solution capable of dissolving the reaction products of chlorine dioxide and the clays and silicates.

2. The method as defined in claim 1 wherein the concentration of the chlorine dioxide in the aqueous solution ranges from 100 to 3,500 ppm.

3. The method as defined in claim 2 and further comprising injecting into the formation prior to step (a) a preflush aqueous solution containing 1 to 5 wt % of a micellar solvent capable of water-wetting the formation sands, clays, and silicates.

4. A method of treating a sandstone formation containing clays or silicates which comprises:
    (a) injecting a preflush into the formation;
    (b) injecting a treating liquid into the formation comprising a blend of an aqueous solution of from 50 to 4,200 ppm chlorine dioxide and liquid $CO_2$ wherein the liquid $CO_2$ constitutes from 1 to 85 volume percent of the treating liquid;
    (c) permitting the $ClO_2$ to react with material in the formation; and
    (d) thereafter injecting into the formation an acid solution capable of dissolving the reaction products of $ClO_2$ and the clays or silicates.

5. The method of claim 4 wherein the preflush includes an effective amount of micellar solvent to water-wet formation materials.

6. The method of claim 4 wherein the aqueous solution further contains an effective amount of an acid selected from the group consisting of HCl, HF, and mixtures thereof to provide a pH of between 0.01 and 2.0.

7. The method of claim 4 wherein the liquid $CO_2$ constitutes from 10 to 30 vol % of the treating liquid.

8. The method of claim 4 wherein the concentration of the chlorine dioxide in the aqueous solution is from 1,000 to 3,000 ppm.

9. A method of treating a subterranean clay-containing sandstone formation which is substantially free of polymeric materials, said method comprises injecting sequentially into the formation at matrix rates and pressures the following liquids:

(a) a preflush;
(b) an acid solution;
(c) a treating liquid comprising a mixture of
   (i) an aqueous solution of HCl and from 50 to 4,200 ppm $ClO_2$ having a pH between 0.01 and 3.2, and
   (ii) liquid $CO_2$ wherein the liquid $CO_2$ constitutes from 10 to 50 vol. % of the treating liquid;
(d) an acid solution containing a sequestering or chelating agent; and
(e) an overflush to displace the preceding solutions into the formation.

10. The method of claim 9 wherein the acid solution of step (b) contains micellar solvent to water-wet the formation sands and clays.

* * * * *